US012017889B1

(12) United States Patent
Alhazzaa et al.

(10) Patent No.: US 12,017,889 B1
(45) Date of Patent: Jun. 25, 2024

(54) CONVERTIBLE STAIRS FOR WHEELCHAIR ACCESSIBILITY

(71) Applicant: KUWAIT UNIVERSITY, Safat (KW)

(72) Inventors: Khaled Ahmad Abdullah Alhazzaa, Safat (KW); Danah Dhaher Mohammad Alfadhli, Safat (KW); Nadiah Wesam Ali Alazmi, Safat (KW); Yasmeen Saleh Aayed Aldhefeeri, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/207,215

(22) Filed: Jun. 8, 2023

(51) Int. Cl.
*B66B 9/08* (2006.01)
*E04F 11/04* (2006.01)
*E04F 11/104* (2006.01)

(52) U.S. Cl.
CPC ............ *B66B 9/0853* (2013.01); *E04F 11/04* (2013.01); *E04F 11/1041* (2013.01)

(58) Field of Classification Search
CPC ...... B66B 9/0853; B66B 9/0869; E04F 11/04; E04F 11/1041
See application file for complete search history.

(56) References Cited

U.S. PATENT DOCUMENTS 4,457,402 A 7/1984 Del Vecchio et al.
5,454,196 A 10/1995 Gaines et al.
5,632,357 A * 5/1997 Matre ..................... B64F 1/315 280/166
5,802,773 A 9/1998 Pingel
9,091,083 B1 7/2015 Goudreau
2021/0228992 A1* 7/2021 Barber .................... B66F 11/04

FOREIGN PATENT DOCUMENTS

CN 105775960 A 7/2016
CN 108797912 A 11/2018
EP 1254858 A1 * 11/2002 ........... B66B 9/0853
EP 3406820 B1 3/2020

OTHER PUBLICATIONS

"Convertible : User-Friendly Staircase by Chan Wen Jie"; printed on Feb. 3, 2023 from https://www.tuvie.com/convertible-user-friendly-staircase-by-chan-wen-jie/.

* cited by examiner

*Primary Examiner* — Jeffrey Donels
(74) *Attorney, Agent, or Firm* — Nath, Goldberg & Meyer; Richard C. Litman

(57) ABSTRACT

The convertible stairs for wheelchair accessibility combine a tiltable staircase with a vertically movable platform. The tiltable staircase includes rotating stairs which can be angularly adjusted between a stepped configuration and a planar, ramp-like configuration. Proximal ends of first and second staircase frames are pivotally secured to the platform such that selective raising and lowering of the platform causes the tiltable staircase to tilt up and down. When the stairs of the staircase are rotated into the planar, ramp-like configuration, the platform may be fully raised to tilt the staircase upward, creating a horizontal surface for the wheelchair to cross from the platform to an upper floor or level. To exit the upper floor or level, the wheelchair user reverses the process, returning to the platform which is lowered to the lower floor or level, also lowering the staircase. The stairs may then be rotated back to a stepped configuration.

15 Claims, 7 Drawing Sheets

CONVERTIBLE STAIRS FOR WHEELCHAIR ACCESSIBILITY

BACKGROUND

1. Field

The disclosure of the present patent application relates to stairs, and particularly to convertible stairs for wheelchair accessibility providing a staircase that is convertible between a typical stepped configuration and a ramp-like configuration, and further to a tiltable staircase combined with an elevator-like platform for lifting a wheelchair-bound user.

2. Description of the Related Art

Although staircases which are convertible into wheelchair accessible ramps are known, such staircases suffer numerous drawbacks which make them difficult and potentially dangerous to use. Of primary concern is that when the stairs are rotated to form a ramp-like surface, gaps exist between the individual stairs and/or not all stairs are rotated synchronously and at the same precise angle. Gaps between the stairs forming the ramp and bumps formed between misaligned stairs can make it difficult or even impossible for a wheelchair to traverse the ramp. If the gaps and/or bumps are excessive in their dimensions, the wheelchair user could potentially lose control of the wheelchair.

In addition to the above, typical convertible staircases convert a conventional staircase into a ramp which is angled at the same degree of inclination as the staircase. However, a typical set of stairs is angled at a much greater angle of inclination than a typical wheelchair ramp. A typical wheelchair user would not be able to easily climb a ramp which is inclined at the same angle as a typical set of stairs. Thus, the typical convertible staircase will have to be constructed with an angle of inclination closer to that of a conventional wheelchair ramp. This, however, may make the staircase awkward for to use for those walking up and down the stairs, and also necessarily requires the staircase to be longer than a typical staircase. Such increased dimensions may not fit easily into an already constructed or pre-planned building. Thus, convertible stairs for wheelchair accessibility solving the aforementioned problems is desired.

SUMMARY

The convertible stairs for wheelchair accessibility combines a tiltable staircase with an elevator-like vertically movable platform. The tiltable staircase includes rotating stairs which can be angularly adjusted between a stepped configuration and a planar, ramp-like configuration. The convertible stairs for wheelchair accessibility includes first and second staircase frames. Each of the first and second staircase frames have opposed proximal and distal ends. First and second vertical supports are further provided, each having opposed upper and lower ends. The upper ends of the first and second vertical supports are respectively secured to the distal ends of the first and second staircase frames. In use, the first and second vertical supports may be positioned beneath a raised surface, such as an upper floor, a landing, a deck or the like, such that the distal ends of the first and second staircase frames are substantially adjacent to, and aligned with, the raised surface, similar to the positioning of the upper terminal end of a staircase.

A plurality of stairs each extend between, and are pivotally attached to, the first and second staircase frames. A slidable shaft is mounted between the first and second staircase frames and extends parallel with respect thereto, beneath the plurality of stairs. Each of the stairs is pivotally attached to the slidable shaft such that linear movement of the slidable shaft synchronously rotates the plurality of stairs. The slidable shaft is selectively slidable between a first position and a second position. In the first position, the plurality of stairs are each parallel and spaced apart from one another, similar to a conventional staircase. In the second position of the slidable shaft, the stairs are rotated such that the plurality of stairs together define a planar surface. The planar surface is adapted for easy passage by a wheelchair.

In addition to the staircase portion, a platform adapted for supporting the wheelchair is further provided. The platform has an adjustable height and the proximal end of each of the first and second staircase frames is pivotally secured to the platform. In use, the platform may start in its lowest position such that the wheelchair user may easily move onto the platform from the floor, ground, sidewalk, etc. Once the wheelchair is securely positioned on the platform, the slidable shaft is driven to move from its first position to its second position, driving the stairs to rotate to form the planar, ramp-like surface. Although the wheelchair could travel up the planar, ramp-like surface, the platform may also be raised until it reaches the height of the next floor. Since the proximal ends of the first and second staircase frames are pivotally attached to the platform, as the platform rises, the first and second staircase frames rotate. The platform rises until it is level with the next floor and, due to the rotation of the first and second staircase frames, the planar, ramp-like surface formed by the plurality of stairs also forms a horizontal surface across which the wheelchair can travel to reach the raised floor. To return to the lower level, the process is reversed, with the wheelchair user traveling over the planar, ramp-like surface formed by the plurality of stairs until reaching the platform. The platform is then lowered to the lower level which causes the first and second staircase frames to rotate downward until reaching their original lowered position. The wheelchair user can then leave the platform and the slidable shaft can be driven to move from the second position back to the first position, returning the stairs to a conventional staircase configuration.

These and other features of the present subject matter will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
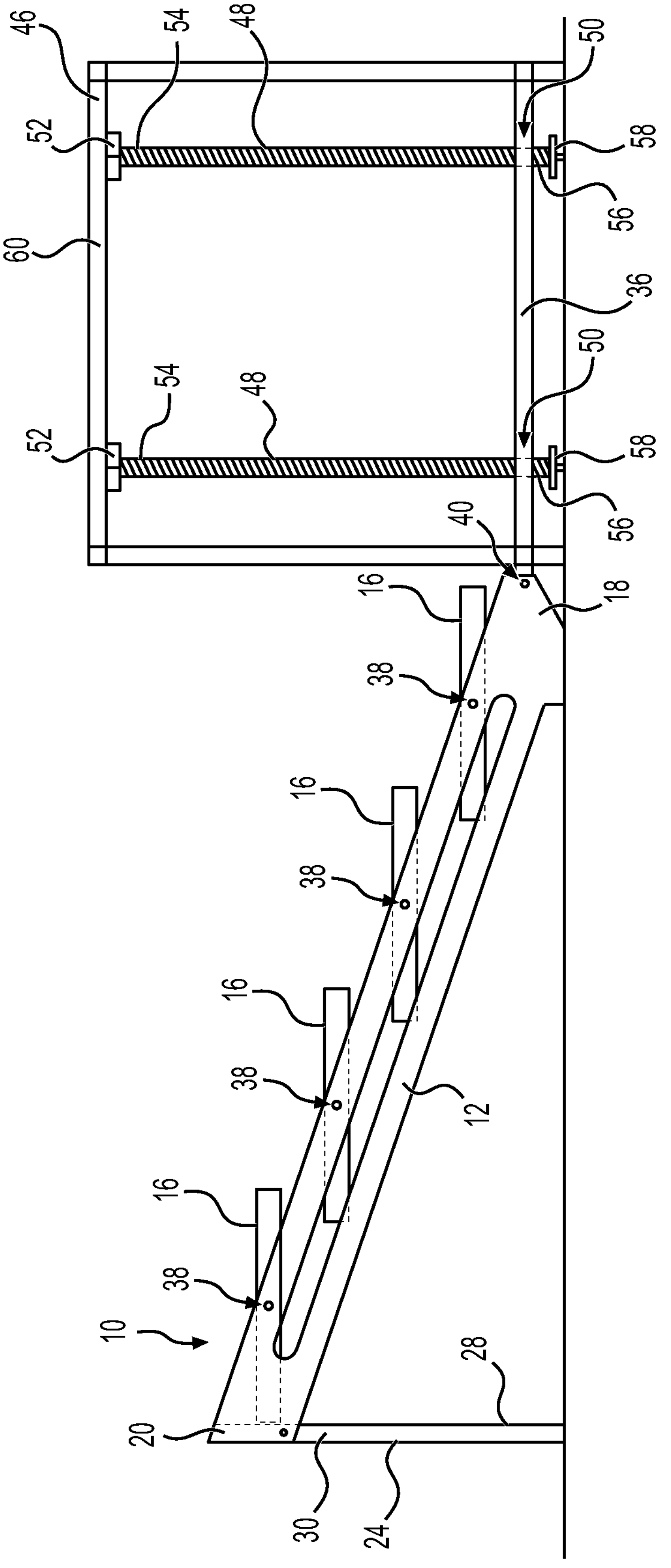
FIG. 1 is a side view of convertible stairs for wheelchair accessibility, shown in an initial configuration.
Figure 2:
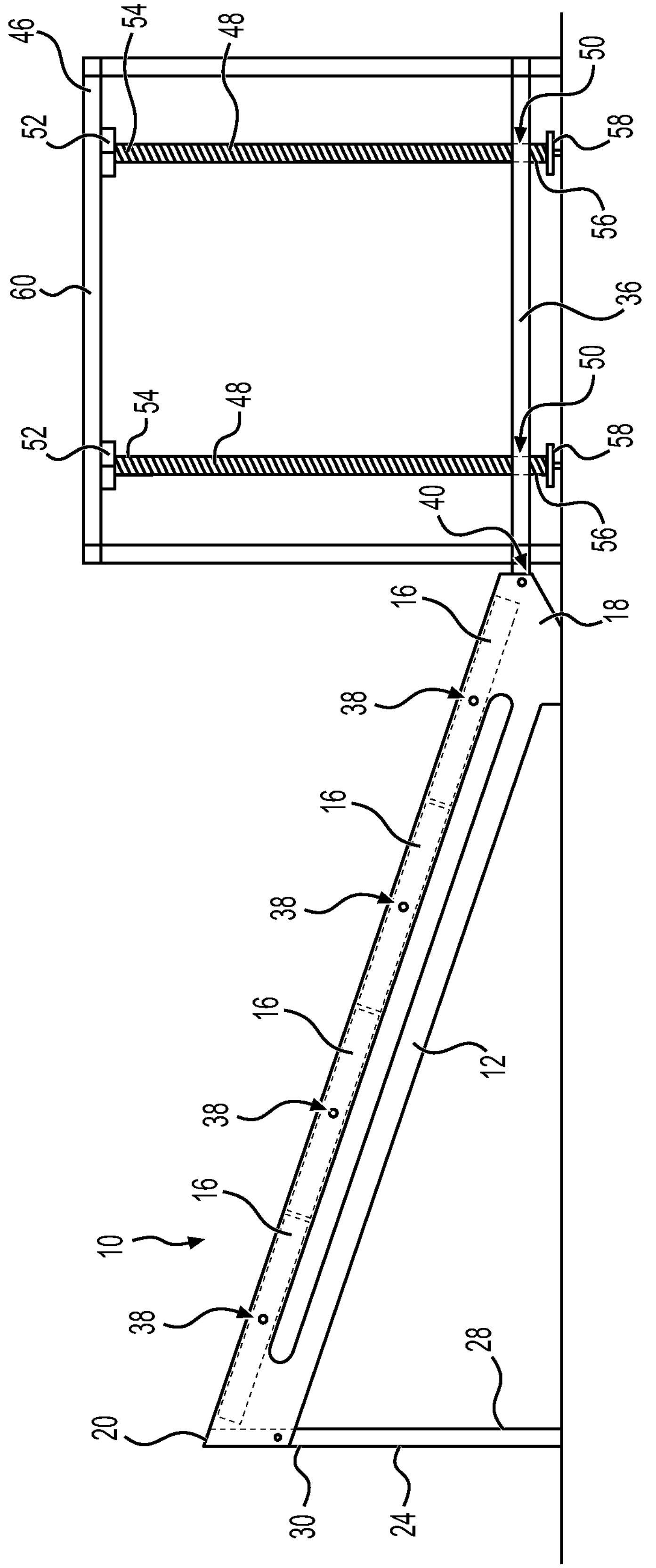
FIG. 2 is a side view of the convertible stairs for wheelchair accessibility, shown in an intermediate configuration where stairs thereof are rotated to form a planar, ramp-like surface.
Figure 4:
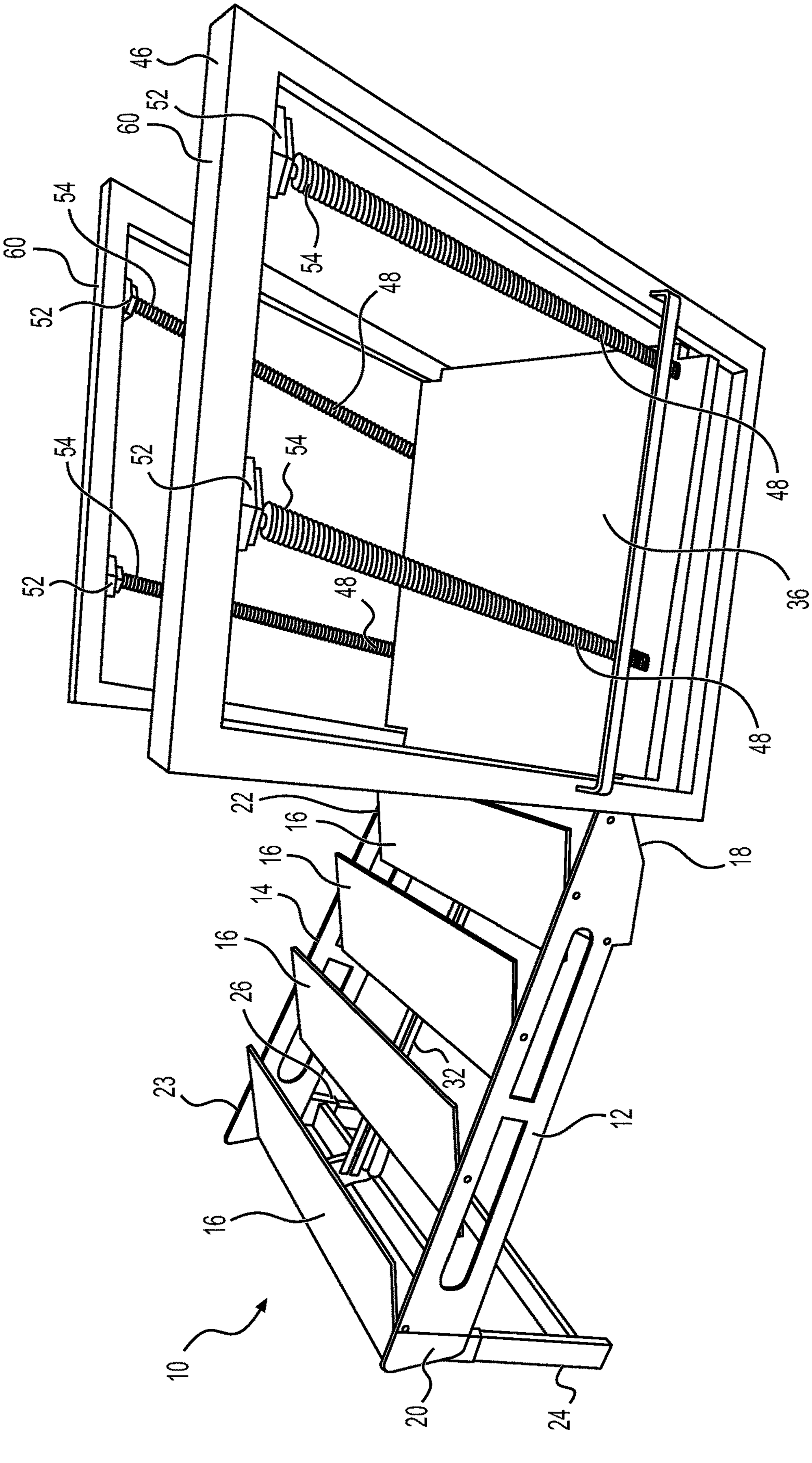
FIG. 4 is a perspective view of the convertible stairs for wheelchair accessibility, shown in the initial configuration.

The convertible stairs for wheelchair accessibility 10 combines a tiltable staircase with an elevator-like vertically movable platform. As shown in FIGS. 1 and 2, the tiltable staircase includes rotating stairs 16 which can be angularly adjusted between a stepped configuration, as shown in FIG. 1, and a planar, ramp-like configuration, as shown in FIG. 2. Referring to FIGS. 1, 2 and 4, the convertible stairs for wheelchair accessibility 10 includes first and second staircase frames 12, 14. It should be understood that the first and second staircase frames 12, 14 are shown for exemplary purposes only and may have any suitable overall shape and relative dimensions. The first staircase frame has opposed proximal and distal ends 18, 20, respectively, and the second staircase frame 14 has opposed proximal and distal ends 22, 23, respectively. Additionally, a first vertical support 24 has opposed lower and upper ends 28, 30, respectively. A second vertical support 26 is similarly provided, such that the upper ends of the first and second vertical supports 24, 26 are respectively secured to the distal ends 20, 23 of the first and second staircase frames 24, 26. It should be understood that first and second vertical supports 24, 26 are shown for exemplary purposes and may have any overall shape and relative dimensions. In use, the first and second vertical supports 24, 26 may be positioned beneath a raised surface, such as an upper floor, a landing, a deck or the like, such that the distal ends 20, 23 of the first and second staircase frames 12, 14 are substantially adjacent to, and aligned with, the raised surface, similar to the positioning of the upper terminal end of a staircase.

A plurality of stairs 16 each extend between the first and second staircase frames 12, 14. Each of the stairs 16 is pivotally attached (shown generally at 38) to the first and second staircase frames 12, 14. In FIGS. 1-4, only four such stairs 16 are shown for purposes of clarity and illustration, though it should be understood that any suitable number of stairs 16 may be pivotally attached to, and extend between, the first and second staircase frames 12, 14. It should be further understood that stairs 16 are shown for exemplary purposes only, and that each stair 16 may have any suitable shape and relative dimensions. As will be discussed in detail below, the plurality of stairs 16 are rotatable such that, together, they may form a continuous planar surface. Thus, although stairs 16 are shown in FIGS. 1-4 for exemplary purposes only, each individual stair 16 should be sized such that when rotated into the configuration of FIGS. 2 and 3, gaps between the stairs 16 are minimized.

Figure 5:
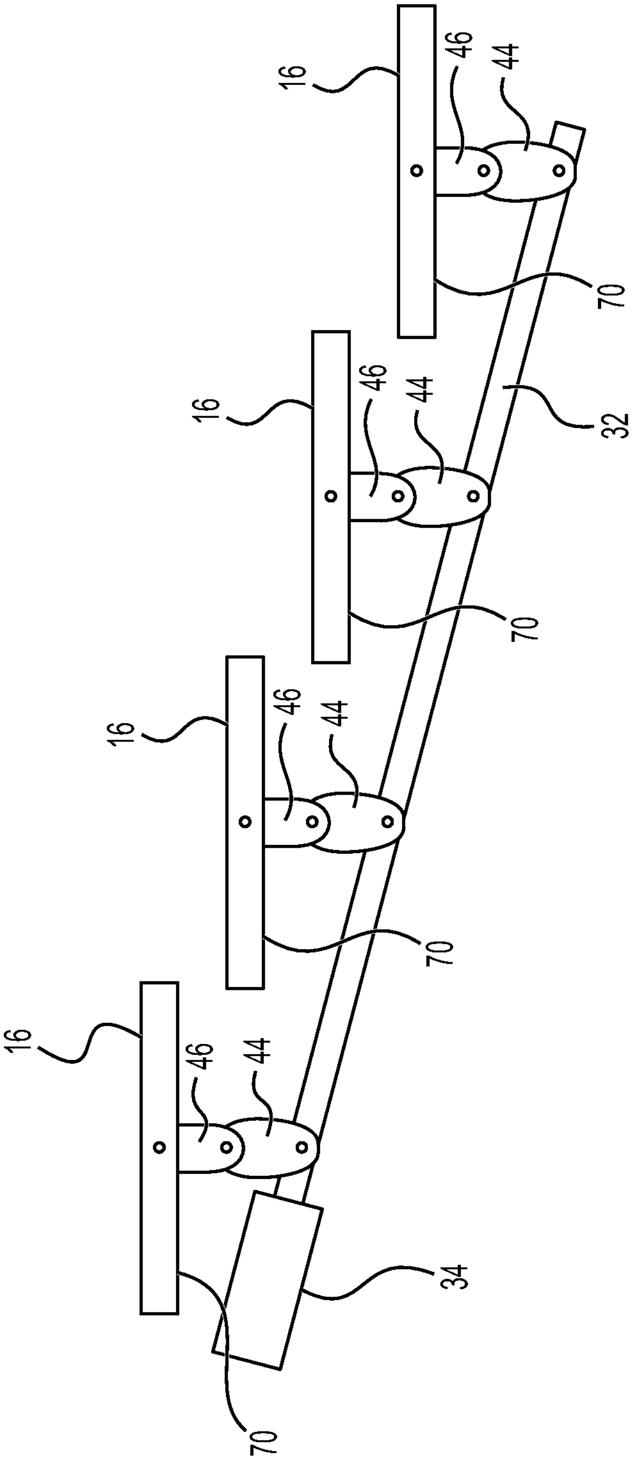
FIG. 5 is a side view of a rotational mechanism for rotating the stairs, shown in the initial configuration.
Figure 6:
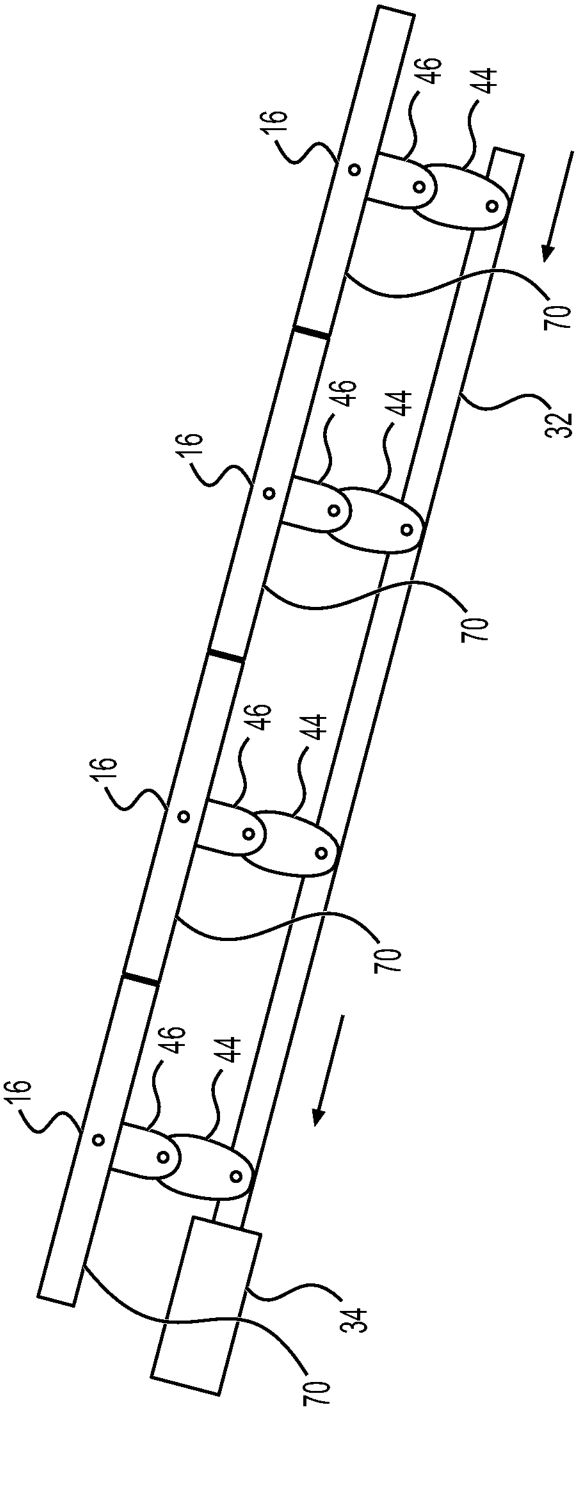
FIG. 6 is a side view of the rotational mechanism for rotating the stairs, shown in the intermediate configuration.

As best seen in FIGS. 4, 5 and 6, a slidable shaft 32 is mounted between the first and second staircase frames 12, 14 and extends parallel with respect thereto, beneath the plurality of stairs 16. Each of the stairs 16 is pivotally attached to the slidable shaft 32 such that linear movement of the slidable shaft 32 synchronously rotates the plurality of stairs. The slidable shaft 32 is selectively slidable between a first position and a second position. In the first position, shown in FIGS. 1 and 5, the plurality of stairs 16 are each parallel and spaced apart from one another, similar to a conventional staircase. In the second position, shown in FIGS. 2 and 6, the stairs 16 are rotated such that the plurality of stairs 16 together define a planar, ramp-like surface. The planar, ramp-like surface is adapted for easy passage by a wheelchair.

It should be understood that any suitable type of pivotal connection between stairs 16 and slidable shaft 32 may be used. In the non-limiting example of FIGS. 5 and 6, each of stairs 16 has a bracket 46 secured to a lower surface 70 thereof. A plurality of links 44 are provided such that each link 44 is pivotally secured at one end to a corresponding bracket 46 and is pivotally secured at its other end to the slidable shaft 32. It should be understood that the shape and relative dimensions of both brackets 46 and links 44 are shown in FIGS. 5 and 6 for exemplary purposes only. It should be further understood that the slidable shaft 32 may be driven to slide between the first position of FIG. 5 and the second position of FIG. 6 using any source of linear motion, such as a pneumatic or hydraulic cylinder, a motor, an actuator or the like. In the non-limiting example of FIGS. 5 and 6, a linear motor 34 is attached to the distal end of slidable shaft 32 for directly driving the slidable shaft 32 to slide between the first and second positions. It should be understood that linear motor 34 may be fixed and mounted to any suitable support, including but not limited to direct or indirect mounting on the first and second vertical supports 24, 26, the distal ends 20, 23 of the first and second staircase frames 12, 14, a crossbar between the first and second vertical supports 24, 26, the wall or other building or structural member against which the distal ends 20, 23 are positioned, or the like.

Figure 3:
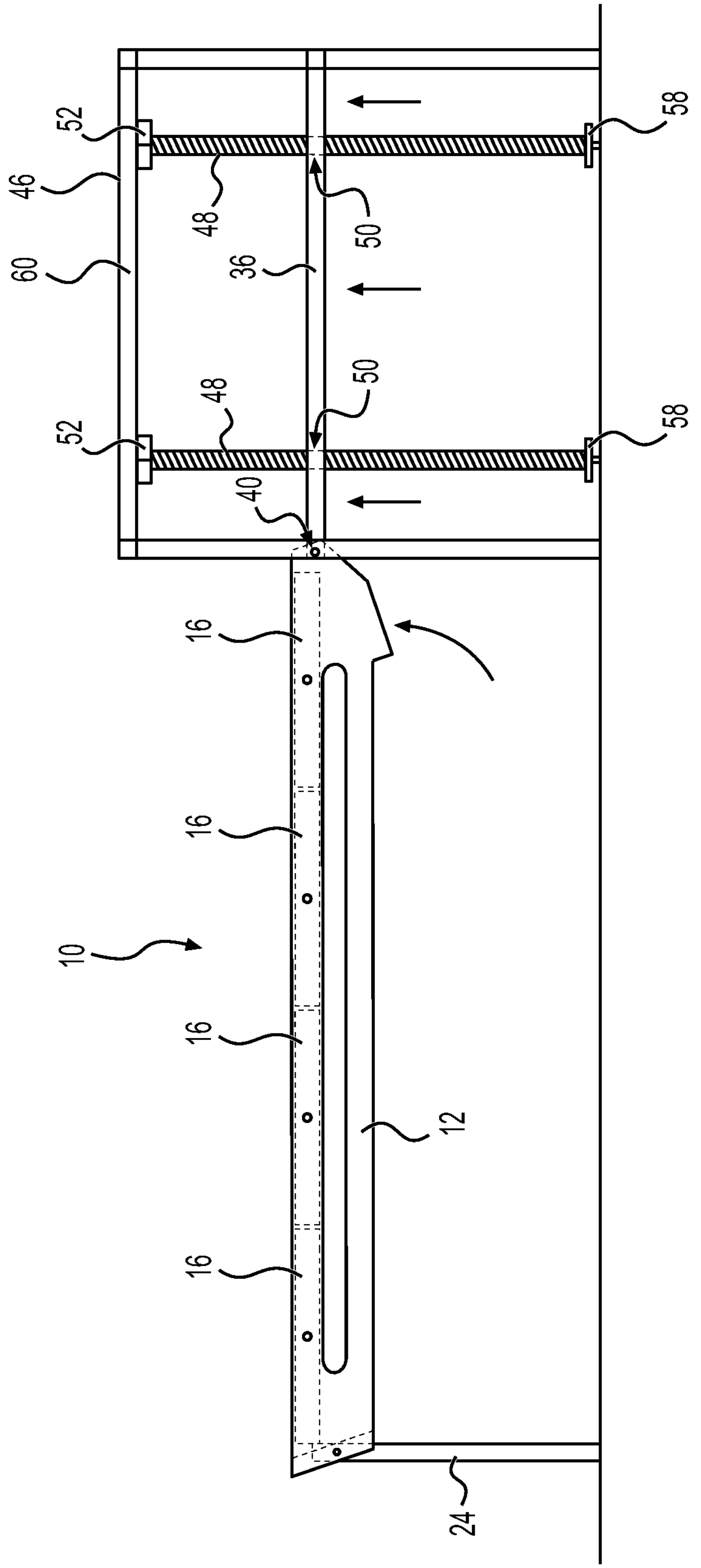
FIG. 3 is a side view of the convertible stairs for wheelchair accessibility, shown in a final configuration where a platform is raised and a staircase portion is lifted into a horizontal position.

In addition to the staircase portion, a platform 36 is provided. The platform 36 is adapted for supporting the wheelchair. The platform 36 has an adjustable height and the proximal ends 18, 22 of each of the first and second staircase frames 12, 14 are pivotally secured to the platform 36 (shown generally at 40 in FIGS. 1-3). In use, the platform 36 may start in its lowest position, as shown in FIGS. 1 and 4, such that the wheelchair user may easily move onto the platform 36 from the floor, ground, sidewalk, etc. Once the wheelchair is securely positioned on the platform 36, the slidable shaft 32 is driven to move from its first position to its second position, driving the stairs 16 to rotate to form the planar, ramp-like surface, as shown in FIG. 2. Although the wheelchair could travel up the planar, ramp-like surface, the platform 36 may also be raised until it reaches the height of the next floor, as shown in FIG. 3. Since the proximal ends 18, 22 of the first and second staircase frames 12, 14 are pivotally attached to the platform 36, as the platform 36 rises, the first and second staircase frames 12, 14 rotate. The platform 36 rises until it is level with the next floor and, due to the rotation of the first and second staircase frames 12, 14, the planar, ramp-like surface formed by the plurality of stairs 16 also forms a horizontal surface across which the wheelchair can travel to reach the raised floor. It should be understood that the distal ends 20, 23 of the first and second staircase frames 12, 14 may be pivotally joined to the upper ends of the vertical supports 24, 26. To return to the lower level, the process is reversed, with the wheelchair user traveling over the planar, ramp-like surface formed by the plurality of stairs 16 until reaching the platform 36. The platform 36 is then lowered to the lower level, which causes the first and second staircase frames 12, 14 to rotate downward until reaching their original lowered position. The wheelchair user can then leave the platform 36 and the slidable shaft 32 can be driven to move from the second position back to the first position, returning the stairs 16 to a conventional staircase configuration.

As shown in FIG. 4, the platform 36 may be mounted within a platform frame 46. It should be understood that the overall configuration, shape and relative dimensions of platform frame 46 are shown for exemplary purposes only. It should be further understood that any suitable type of drive may be used to selectively raise and lower the platform 36 within platform frame 46. In the non-limiting example shown in FIGS. 1, 4 and 7, a plurality of threaded rods 48 are provided, with each of the threaded rods 48 passing through and engaging a corresponding threaded passage 50 formed through the platform 36. Although four threaded rods 48 are shown, it should be understood that any suitable number of threaded rods 48 may be used. Since the platform frame 46 prevents rotation of platform 36 in the horizontal plane, driven rotation of the threaded rods 48 with respect to threaded passages 50 raises and lowers the platform 36, dependent on the direction of rotation of the threaded rods 48.

In the non-limiting example of FIGS. 1 and 4, the platform frame 46 has at least one upper frame member 60, and the upper ends 54 of the threaded rods 48 are each rotatably coupled to the at least one upper frame member 60. In the non-limiting example of FIGS. 1-3, the upper ends 54 are shown as being rotatably received within bearings 52 mounted the at least one upper frame member 60, thus securing the threaded rods 48 in a vertical orientation. However, it should be understood that the upper ends 54 may be stabilized through rotational coupling with any suitable type of structure, such as a cuff, a passage formed through the at least one upper frame member 60 or the like.

Figure 7:
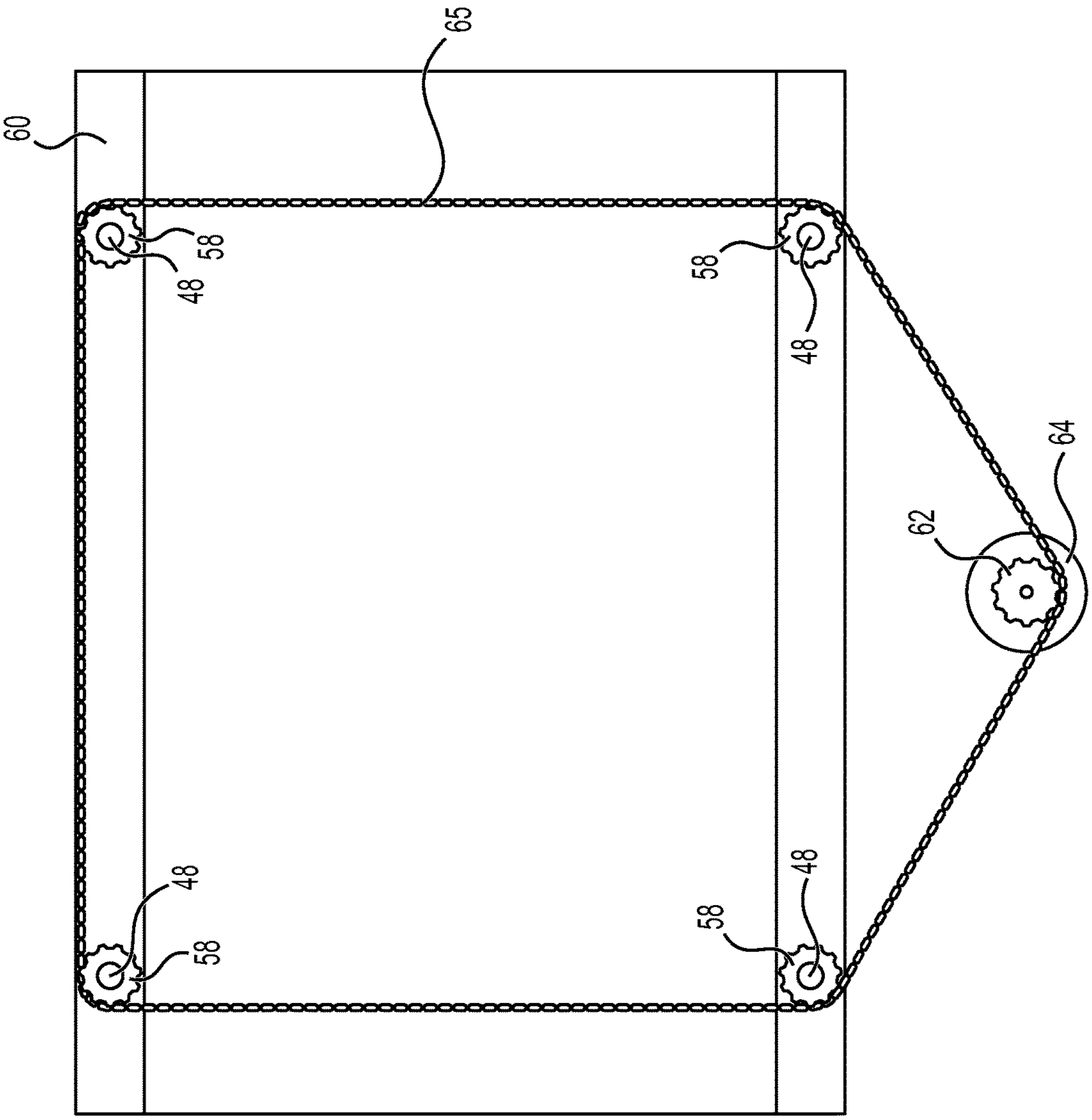
FIG. 7 is a top diagrammatic view of a drive mechanism for selectively raising and lowering the platform.

It should be understood that the plurality of threaded rods 48 may be driven to rotate using any suitable type of drive for selectively synchronously rotating the threaded rods 48 either clockwise or counterclockwise. In the non-limiting example shown in FIGS. 1-3 and 7, a plurality of first gears 58 are each rotatably mounted beneath the platform 36. The lower ends 56 of the plurality of threaded rods 48 are each mounted on a corresponding one of the first gears 58. A second gear 62 may also be provided, and a rotary motor 64 may be coupled to the second gear 62 for selectively driving the second gear 62 to rotate. A continuous chain 65 is coupled to each of the plurality of first gears 58 and the second gear 62. Thus, the rotatory motor 64 may drive the second gear 62 to rotate either clockwise or counterclockwise which, via coupling through the continuous chain 65, causes the first gears 58 to also rotate clockwise or counterclockwise. This rotation, in turn, drives the threaded rods 48 to rotate either clockwise or counterclockwise, thus selectively raising or lowering the platform 36. It should be understood that the continuous chain 65 is not shown in FIGS. 1-3 for purposes of clarity and illustration only, particularly, such that the gears 58 and the lower ends 56 of threaded rods 48 can be seen clearly. Additionally, it should be understood that FIG. 7 is diagrammatic in nature, showing a top view without the platform 36 or the at least one upper frame member 60 such that the gears 58, 62 and the continuous chain 65 can be seen clearly. It should be further understood that the linear motor 34 and the rotatory motor 64 may be controlled using any suitable type of controller, such as a remote controller carried by the wheelchair user, buttons mounted on the building structure (similar to elevator buttons), or the like.

It is to be understood that the convertible stairs for wheelchair accessibility is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. Convertible stairs for wheelchair accessibility, comprising:

first and second staircase frames, each of the first and second staircase frames having opposed proximal and distal ends;

first and second vertical supports each having opposed upper and lower ends, the upper ends thereof being respectively secured to the distal ends of the first and second staircase frames;

a plurality of stairs each extending between and pivotally attached to the first and second staircase frames;

a slidable shaft mounted between the first and second staircase frames and extending parallel with respect thereto, wherein each of the stairs is pivotally attached to the slidable shaft such that linear movement of the slidable shaft synchronously rotates the plurality of stairs;

a platform adapted for supporting a wheelchair, wherein the platform has an adjustable height, and wherein the proximal end of each of the first and second staircase frames is pivotally secured to the platform, a plurality of links, wherein each of the links is pivotally attached to a corresponding one of the plurality of stairs and is pivotally attached to the slidable shaft; and a plurality of brackets respectively secured to bottom surfaces of the plurality of stairs, wherein each of the links is pivotally connected to a corresponding one of the brackets.

2. The convertible stairs for wheelchair accessibility as recited in claim 1, wherein the slidable shaft is selectively slidable between a first position and a second position, wherein the plurality of stairs are each spaced apart from one another when the slidable shaft is in the first position, and wherein the plurality of stairs together define a planar surface when the slidable shaft is in the second position.

3. The convertible stairs for wheelchair accessibility as recited in claim 2, further comprising a linear motor coupled to the slidable shaft for selectively driving the linear movement of the slidable shaft.

4. The convertible stairs for wheelchair accessibility as recited in claim 1, further comprising a platform frame, wherein the platform is mounted within the platform frame.

5. The convertible stairs for wheelchair accessibility as recited in claim 4, further comprising a plurality of threaded rods, wherein each of the threaded rods passes through and engages a corresponding threaded passage formed through the platform.

6. The convertible stairs for wheelchair accessibility as recited in claim 5, wherein the platform frame has at least one upper frame member, and wherein upper ends of the plurality of threaded rods are each rotatably coupled to the at least one upper frame member.

7. The convertible stairs for wheelchair accessibility as recited in claim 6, further comprising a plurality of first gears, and wherein lower ends of the plurality of threaded rods are each mounted on a corresponding one of the first gears.

8. The convertible stairs for wheelchair accessibility as recited in claim 7, further comprising:

a second gear;

a rotary motor for selectively driving the second gear to rotate; and a continuous chain coupled to each of the plurality of first gears and the second gear.

9. Convertible stairs for wheelchair accessibility, comprising:

first and second staircase frames, each of the first and second staircase frames having opposed proximal and distal ends;

first and second vertical supports each having opposed upper and lower ends, the upper ends thereof being respectively secured to the distal ends of the first and second staircase frames;

a plurality of stairs each extending between and pivotally attached to the first and second staircase frames;

a slidable shaft mounted between the first and second staircase frames and extending parallel with respect thereto, wherein each of the stairs is pivotally attached to the slidable shaft such that linear movement of the slidable shaft synchronously rotates the plurality of stairs, wherein the slidable shaft is selectively slidable between a first position and a second position, wherein the plurality of stairs are each spaced apart from one another when the slidable shaft is in the first position, and wherein plurality of stairs together define a planar surface when the slidable shaft is in the second position;

a platform adapted for supporting a wheelchair, wherein the platform has an adjustable height, and wherein the proximal end of each of the first and second staircase frames is pivotally secured to the platform, a plurality of links, wherein each of the links is pivotally attached to a corresponding one of the plurality of stairs and is pivotally attached to the slidable shaft; and a plurality of brackets respectively secured to bottom surfaces of the plurality of stairs, wherein each of the links is pivotally connected to a corresponding one of the brackets.

10. The convertible stairs for wheelchair accessibility as recited in claim 9, further comprising a linear motor coupled to the slidable shaft for selectively driving the linear movement of the slidable shaft.

11. The convertible stairs for wheelchair accessibility as recited in claim 9, further comprising a platform frame, wherein the platform is mounted within the platform frame.

12. The convertible stairs for wheelchair accessibility as recited in claim 11, further comprising a plurality of threaded rods, wherein each of the threaded rods passes through and engages a corresponding threaded passage formed through the platform.

13. The convertible stairs for wheelchair accessibility as recited in claim 12, wherein the platform frame has at least one upper frame member, and wherein upper ends of the plurality of threaded rods are each rotatably coupled to the at least one upper frame member.

14. The convertible stairs for wheelchair accessibility as recited in claim 13, further comprising a plurality of first gears, and wherein lower ends of the plurality of threaded rods are each mounted on a corresponding one of the first gears.

15. The convertible stairs for wheelchair accessibility as recited in claim 14, further comprising:

a second gear;

a rotary motor for selectively driving the second gear to rotate; and a continuous chain coupled to each of the plurality of first gears and the second gear.

* * * * *